Patented Oct. 18, 1927.

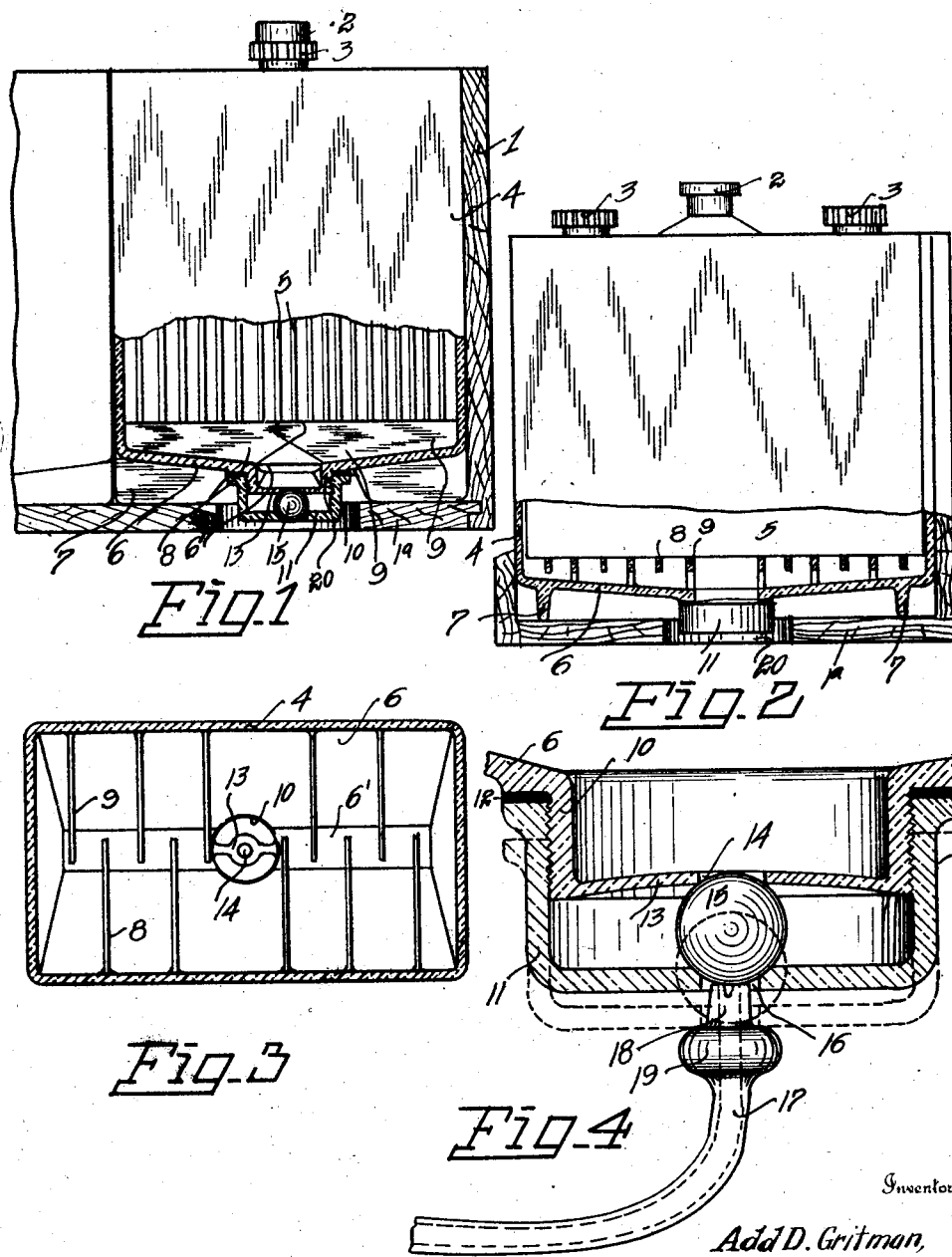

1,645,698

UNITED STATES PATENT OFFICE.

ADD D. GRITMAN AND CARL GRITMAN, OF SPOKANE, WASHINGTON.

STORAGE BATTERY.

Application filed December 30, 1925. Serial No. 78,304.

Our present invention relates to improvements in storage batteries as used for ignition and starting purposes for automobiles and for other purposes, and relates particularly to the construction of the battery cell. As is well known if the acids of the storage battery are not frequently renewed and the cells cleaned a sediment forms in the bottom of the cell and in many instances this sediment forms short circuits with the battery plates resulting in deterioration of the battery and its ultimate ruin, with consequent inconvenience and expense in replacing the battery.

The primary object of our invention is the provision of means for facilitating the cleansing and draining of the battery cell for the prevention of sediment therein. For this purpose we construct the cell with a false bottom upon which the elevated plates of the cell rest and this construction provides for a sump or well in the bottom of the cell for sediment. Means are also provided for draining the sediment from the bottom of the cell and for permitting entrance of a hose or tube for cleaning the interior of the cell.

The invention consists in certain novel combinations and arrangements of parts as will hereinafter be more fully set forth and claimed. In the accompanying drawings we have illustrated one complete example of the physical embodiment of our invention wherein the parts of a cell are combined and arranged in accordance with the best mode we have thus far devised for the practical application of the principles of our invention.

Figure 1 is a view showing a portion of a battery box or casing in longitudinal section, and disclosing also a portion of a cell in section, according to our invention.

Figure 2 is an end view of a battery with a portion in vertical transverse section and disclosing also a portion of a cell in section at right angles to the view of Figure 1.

Figure 3 is a horizontal section of a cell showing its interior bottom plan.

Figure 4 is an enlarged detail sectional view at the bottom of the cell and box showing the drain opening closed by a valve.

In carrying out our invention we have illustrated a well known type of storage battery having the usual wood box 1, vent plug 2 and terminals 3, the latter on the cells which are indicated as a whole by the numeral 4 and used in suitable numbers in the battery box. The usual plates 5 are indicated in conventional form and they are elevated above the bottom 6 of the cell which bottom is formed with sloping walls to a central, longitudinally extending portion 6' to form a sump or well in the bottom of the cell for accumulated sediment.

The cell is fashioned with exterior, bottom flanges 7 for supporting it on the bottom 1ª of the box or casing 1 and as usual is made of insulated material as hard rubber. The plates at their lower edges rest upon two series of oppositely extending, transversely arranged ribs 8 and 9 that are integral with the opposite walls and project slightly more than half way across the cell and above the bottom of the cell. The inner free ends of the ribs overlap and the ribs of the two series are alternated as shown in Figure 3 to provide adequate support for the plates of the cell.

These two series of ribs are of the same material as the cell and as they project across the cell and above its bottom they provide sufficient space for a sump below the plates to receive accumulated sediment and the sediment in the sump of course does not contact with the plates.

At the center of the cell bottom and the deepest portion of the sump an outlet or drain is provided in the form of an annular flange or open boss 10 integral with the cell bottom 6 and exteriorly threaded for the reception of a closure or cap 11. Between the cap and the bottom of the cell, about the annular flange is arranged a packing ring or gasket 12 to form an air and water tight joint between the closure cap and the cell.

Within the lower end of the open boss 10 is arranged a cross bar or spider frame 13 having a central aperture 14 therein, and this bar which is slightly arched as seen in Figure 4 is of sufficient resiliency to permit the ball valve 15 to be rigidly clamped between the apertured cross bar or spider frame and the bottom of the cap.

The cap is fashioned with a central aperture 16 in which the ball valve is seated, and it will be apparent that when the closure cap 11 is screwed up tight against the gasket the ball valve will be rigidly held in its seat 16 (to close it) between the bottom of the cap and the spider frame 13.

For draining the cell of its liquid or acid the cap is unscrewed to dotted line position in Figure 4, and a draining hose or tube 17 having a nozzle 18 and head 19 is used. The bottom of the box is provided with an opening 20 for access of the nozzle and to give access to the cap, and after the cap has been turned to dotted position in Figure 4 it will be apparent that the nozzle may be inserted up through the opening 20 and into the valve seat 16 to lift the ball valve 15 from its seat. The nozzle is of smaller diameter than the drain opening of the cap and is preferably tapered so that it may be slipped into the opening sufficiently far to allow the head 19 on the tube to the cap opening 16 and prevent flow of liquid from the cap except through the nozzle and into the tube.

After the interior of the cell has been drained, water may be forced through the hose to the interior of the cell to cleanse it, and if desired the liquid or acid may again be restored to the cell, or fresh water supplied thereto.

Each of the cells of the battery is provided with the drain and valve features in order that access may be had to their interiors and the entire battery maintained in proper working condition.

Having thus described our invention, what we claim as new and desire to secure by Letters Patent is—

1. A battery cell having elevated cross bars forming a sump in its bottom and a drain opening in its bottom, a closure cap for said opening having an outlet port, a valve within the cap normally closing said port, and a stop member on said sump for cooperation with said valve.

2. A battery cell having an elevated false bottom forming a sump therein and a drain opening in its bottom, a screw cap for said opening and an outlet port in said cap, a ball valve normally closing said port, and means for retaining said valve in closed position.

3. A battery cell having elevated cross bars forming a sump and an annular flange forming a drain opening in its bottom, a closure cap for said flange having an outlet port, a cross bar in said flange and a ball valve within the cap normally retained between said port and cross bar to close the port.

4. A battery cell having a series of spaced interengaging cross-bars formed integral with the bottom and side walls of the cell, said cross-bars being elevated above the cell bottom to form a false bottom having a sump, external supporting means on the bottom of said cell for disposing said sump above a support on which the cell rests, an annular flange formed on the bottom of said cell at the sump and surrounding a drain opening provided through the cell bottom, a valve seat carried by said flange in the drain opening, a closure cap adapted to be secured on said flange and having a drain port, and a valve disposed between said closure cap and the valve seat for closing said drain port on movement of the closure cap in one direction.

In testimony whereof we affix our signatures.

ADD D. GRITMAN.
CARL GRITMAN.